(12) United States Patent
Kornfeld et al.

(10) Patent No.: US 7,247,993 B2
(45) Date of Patent: Jul. 24, 2007

(54) ION ACCELERATOR ARRANGEMENT

(75) Inventors: Günter Kornfeld, Elchingen (DE); Gregory Coustou, Ulm (DE); Norbert Koch, Ulm (DE)

(73) Assignee: Thales Electron Devices GmbH, Ulm (DE)

( * ) Notice: Subject to any disclaimer, the term of this patent is extended or adjusted under 35 U.S.C. 154(b) by 0 days.

(21) Appl. No.: 10/541,915

(22) PCT Filed: Dec. 10, 2003

(86) PCT No.: PCT/EP03/13988

§ 371 (c)(1), (2), (4) Date: Feb. 8, 2006

(87) PCT Pub. No.: WO2004/064459

PCT Pub. Date: Jul. 29, 2004

(65) Prior Publication Data

US 2006/0138966 A1  Jun. 29, 2006

(30) Foreign Application Priority Data

Jan. 11, 2003  (DE) .................. 103 00 728

(51) Int. Cl.
*H01J 7/24* (2006.01)
*H05B 31/26* (2006.01)
(52) U.S. Cl. .............. 315/111.61; 315/111.81
(58) Field of Classification Search ........... 315/111.21, 315/111.31, 111.41, 111.61, 111.81, 111.91; 60/202, 203.1; 250/423 R, 423 F, 281, 285, 250/293

See application file for complete search history.

(56) References Cited

U.S. PATENT DOCUMENTS

| | | | |
|---|---|---|---|
| 3,613,370 A | 10/1971 | Paine | 60/202 |
| 5,847,493 A | 12/1998 | Yashnov et al. | 315/111.21 |
| 5,892,235 A * | 4/1999 | Yamazaki et al. | 250/492.21 |
| 6,448,721 B2 * | 9/2002 | Raitses et al. | 315/501 |
| 6,696,792 B1 * | 2/2004 | Foster | 315/111.21 |
| 6,777,862 B2 * | 8/2004 | Fisch et al. | 313/359.1 |

FOREIGN PATENT DOCUMENTS

| | | |
|---|---|---|
| DE | 15 39 264 | 5/1970 |
| DE | 198 28 704 | 12/1999 |
| DE | 100 14 033 | 10/2001 |
| DE | 101 30 464 | 1/2003 |
| WO | WO 00/01206 | 1/2000 |
| WO | WO 01/71185 | 9/2001 |

OTHER PUBLICATIONS

*Plasma Sources, Science and Technology IOP Publishing UK*, vol. 9, No. 1, Feb. 2000 (2000-2002) pp. 68-76, "A low-power, linear-geometry Hall plasma source with an open electron-drift", by Schmidt D P et al.

* cited by examiner

*Primary Examiner*—Shih-Chao Chen
*Assistant Examiner*—Minh Dieu A
(74) *Attorney, Agent, or Firm*—Collard & Roe, P.C.

(57) ABSTRACT

The invention relates to an ion accelerator arrangement which uses a combination of a magnetic field having a cusp structure and a cross-section of an ionisation chamber that is extended in one direction transversally in relation to the longitudinal axis. This enables the ionic current to be advantageously scaled.

5 Claims, 1 Drawing Sheet

ION ACCELERATOR ARRANGEMENT

CROSS REFERENCE TO RELATED APPLICATIONS

Applicants claim priority under 35 U.S.C. §119 of GERMAN Application No. 103 00 728.8 filed on Jan. 11, 2003. Applicants also claim priority under 35 U.S.C. §365 of PCT/EP2003/013988 filed on Dec. 10, 2003. The international application under PCT article 21(2) was not published in English.

FIELD OF THE INVENTION

The invention relates to an ion accelerator arrangement.

Ion accelerator arrangements are in use, for example, for surface treatments, particular in semiconductor technology, or as drives for space missiles. Ions are typically generated from a neutral working gas for drive purposes, particularly from a noble gas, and accelerated. Two construction principles, in particular, have proven themselves for generating and accelerating ions.

BACKGROUND OF THE INVENTION

In the case of grid accelerators, the positively charged ions are drawn from a plasma by means of a grid arrangement, in which a first grid that borders on the plasma chamber lies at an anode potential, and a second grid, offset in the beam exit direction, lies at a more negative cathode potential, and electrostatically accelerated between the two grids. Such an arrangement is known from U.S. Pat. No. 3,613,370, for example. The ion stream density of such an accelerator arrangement is limited to low values due to spatial charging effects.

Another design provides a plasma chamber through which an electric field for accelerating positively charged ions in the direction of a beam exit opening, for one thing, and a magnetic field for guiding electrons that serve to ionize a neutral working gas, for another thing, pass. In particular, accelerator arrangements having a ring-shaped plasma chamber, in which the magnetic field runs predominantly radially and electrons move on closed drift paths under the influence of the electric and magnetic fields move on closed drift paths under the influence of the electric and magnetic fields have been in use for some time. Such an accelerator arrangement is known, for example, from U.S. Pat. No. 5,847,493.

An embodiment of a pulse plasma accelerator, as it is known from DE 15 39 264, for example, which deviates significantly from this, both theoretically and practically, provides electrode rails at opposite sides of a flat plasma channel, between which a current flows crosswise to the longitudinal direction of a channel, in a working gas that is located in the channel, by means of pulsed discharges, thereby creating a plasma. The current loop with electrode rails and current through the plasma chamber results in pulse-like ejection of the ionized gas, by means of magnetic displacement.

SUMMARY OF THE INVENTION

In the case of a new type of ion accelerator arrangement of the closed electron drift type, with electric and magnetic fields in a plasma chamber, the magnetic field demonstrates a particular structure, with a field progression predominantly parallel to the longitudinal direction, in longitudinal segments of a second type, and a progression predominantly perpendicular to the longitudinal direction, particularly radial, in longitudinal segments of a first type, which particularly demonstrate a progression of the magnetic field also referred to as cusp. The arrangement is preferably constructed in several stages, with longitudinal segments of the first and second type alternately following one another. Such ion accelerator arrangements are known, for example, from DE 100 14 033 A1, DE 101 30 464 A1, or DE 198 28 704 A1.

The present invention is based on the task of indicating an ion accelerator arrangement having a flexibly variable construction principle.

The invention is described in claim 1. The dependent claims contain advantageous embodiments and further developments of the invention.

The invention is based on the magnetic field structure known from DE 100 14 033 A1. The ionization chamber has a simply cohesive cross-sectional surface in a sectional plane that runs transverse to the longitudinal direction, i.e. is structured without the center part that delimits the chamber radially towards the center in the case of the ring-shaped ionization chambers.

The intentional deviation from the circular chamber cross-section and the enlargement of the chamber cross-section in one transverse direction relative to the dimension of the chamber in a second transverse direction, preferably by at least a factor of 2, allows scaling of the ion stream that is issued, to any desired degree, to a great extent, as necessary, while maintaining other parameters of the arrangement. The arrangement particularly also demonstrates an advantageous plasma density with reference to the cross-sectional surface.

BRIEF DESCRIPTION OF THE DRAWINGS

The invention is explained in detail below, using a preferred example, making reference to the figures. These show.

DETAILED DESCRIPTION OF THE INVENTION

Figure 1:
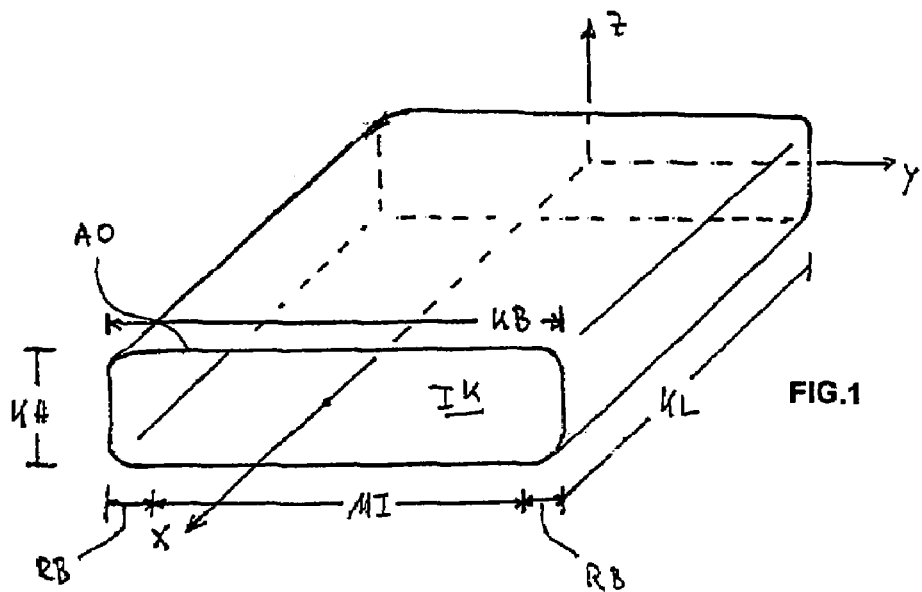
FIG. 1 a fundamental form of an ionization chamber,
FIG. 2 a sectional diagram in the z-x plane,
FIG. 3 a sectional diagram, as a detail, in the x-y plane,
FIG. 4 a sectional diagram in the y-z plane.

In the slanted view according to FIG. 1, in a slanted view with a view from the front into the ion exit opening AO, a fundamental form of an ionization chamber IK for an ion accelerator arrangement according to the invention is shown, which is structured in this diagram, for the sake of simplicity, as being approximately block-shaped with a width KB in the y direction, a height KH in the z direction, and a length KL in the x direction. The coordinate axes of the coordinate system are laid in the direction of the main axes of the ionization chamber. Let the coordination origin be disposed at the foot of the ionization chamber at the anode electrode, as an extension of the center longitudinal axis of the arrangement, which coincides with the x axis in the example shown. The x direction is also referred to as the longitudinal direction, the y and z directions are also referred to as transverse directions. The ionization chamber preferably demonstrates both mirror symmetry with regard to the x-z plane and mirror symmetry with regard to the x-y plane.

The edge segments RB that delimit the chamber in the y direction preferably have a rounded progression of the wall surface of the chamber wall that delimits the ionization chamber, as compared with a pure block shape. In a center region MI in the y direction, the height KH of the chamber IK is essentially constant. For reasons of a simplified explanation, the ionization chamber is assumed to be essentially cylindrical in the following, i.e. having an essentially uniform cross-sectional area in the x direction, without the invention being supposed to be limited to this. In FIG. 1, for the sake of clarity, the electrode arrangement, the magnet arrangement, as well as the progression of the electric and magnetic fields are not shown.

Figure 2:
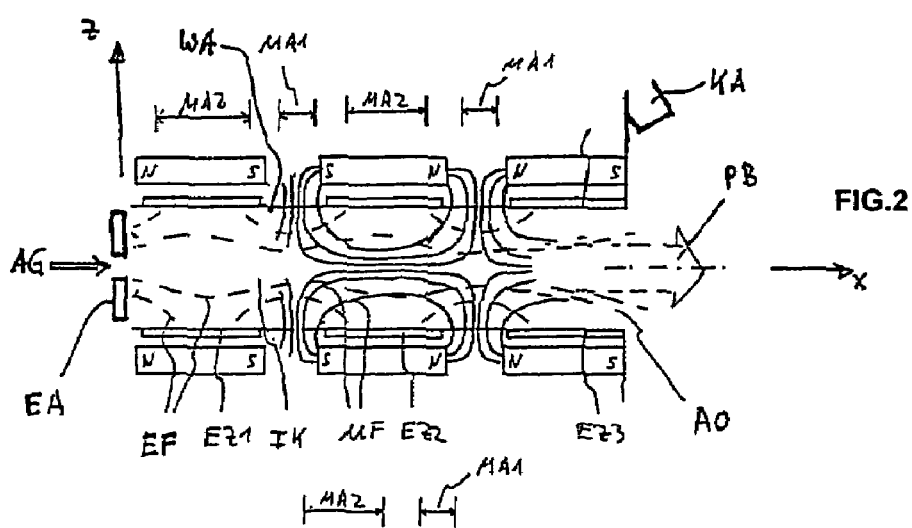

From the sectional diagram representation of FIG. 2 in the x-z plane of the coordinate system according to FIG. 1, the typical progression of the known magnetic field in the ionization chamber, which must be viewed as being essential, is clearly evident. This magnetic field MF is characterized in that longitudinal segments MA1 of a first type and longitudinal segments MA2 of a second type follow one another in the longitudinal direction (x) of the arrangement, whereby in longitudinal segments MA1 of the first type, the magnetic field runs predominantly parallel to the y-z plane, i.e. perpendicular to the longitudinal direction, and in longitudinal segments MA2 of the second type, it runs predominantly parallel to the longitudinal direction x. In longitudinal segments of the first type, a reversal of the direction of the longitudinal component of the magnetic field takes place in the longitudinal direction. The magnetic field structure in the longitudinal segment MA1 of the first type is also referred to as a cusp structure. The longitudinal segments of the first and second type can follow one another directly, or, as in the diagram, be spaced apart by intermediate segments in the longitudinal direction. The magnetic field lines continue from the longitudinal segments of the first type into the longitudinal segment MA1 of the first type continuously, if applicable through the intermediate segments that lie between them. The magnet arrangement, i.e. the magnetic field is advantageously multi-stage, in such a manner that the magnetic field in the ionization chamber alternately has several longitudinal segments of the first type and several longitudinal segments of the second type, having the characteristic field progressions as described, in the longitudinal direction. The magnetic field MF can be generated by means of coils and/or permanent magnets PM, in known manner.

The electrode arrangement can contain a cathode KA disposed at the ion exit opening AO of the ionization chamber IK and an anode EA disposed opposite the ion exit opening in the x direction, in known manner. Advantageously, particularly in the case of the preferred multi-stage embodiment of the magnet arrangement, intermediate electrodes EZ1, EZ2, EZ3 can also be provided on the wall WA of the ionization chamber, which can particularly lie at fixed or sliding intermediate potentials between the anode potential and the cathode potential. The anode EA can advantageously be disposed at the bottom of the ionization chamber, which faces away from the ion exit opening AO, as shown. In FIG. 2, the cathode KA is disposed laterally offset from the ion exit opening, in the longitudinal direction, in known manner. In particular, the cathode can serve an electron source for primary electrons to be introduced into the ionization chamber, to ionize a working gas, and/or for electrons to be added to the exiting ion beam PB, for electrical neutralization. A neutral working gas AG is preferably introduced into the ionization chamber in the region of the anode EA.

In another advantageous embodiment, the cathode can be structured as an electrode that does not emit electrons and therefore does not serve as a neutralizer and/or as a primary electron source for gas ionization. In this connection, the cathode can advantageously be provided by a housing part that surrounds the exit opening of the ionization chamber and lies at cathode potential.

Figure 3:
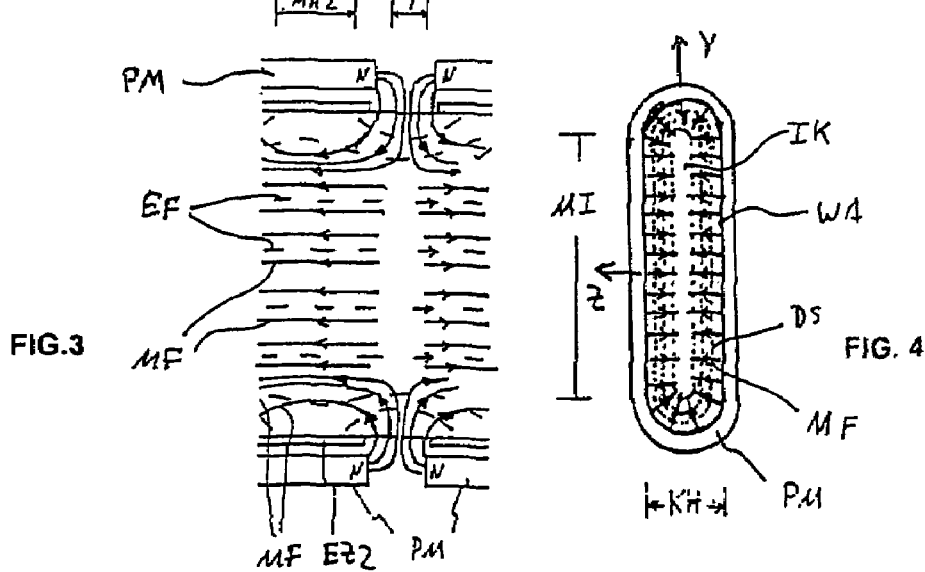
Figure 4:
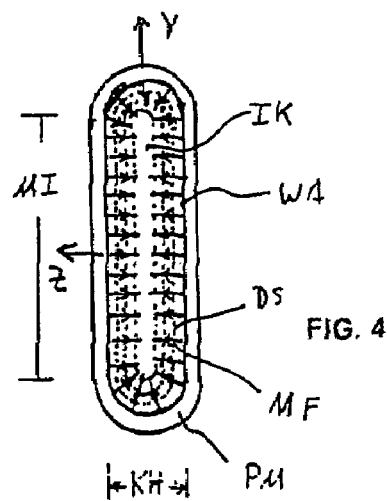

Under the influence of the electrostatic field EF of the electrode arrangement, which is schematically shown with broken lines in FIG. 2, the electrons are accelerated towards the anode, and the positively charged gas ions are accelerated towards the ion exit opening, whereby the electrons form closed drift streams DS about the longitudinal direction (FIG. 4), under the influence of the magnetic field, particularly in the longitudinal segments MA1 of the first type of the magnetic field. In FIG. 3, a detail of a sectional diagram in the x-y plane according to FIG. 1 is shown, with the representation of a typical magnetic field progression in this region. FIG. 4 shows a section in a sectional plane parallel to the y-z plane, in the region of a longitudinal segment MA1, with a representation of a typical magnetic field progression and a ring-shaped, closed drift stream DS. The circulation direction of the drift streams depends on the radial direction of the magnetic field in the longitudinal segments MA1 of the first type, and alternates, in each instance, between consecutive longitudinal segments MA1 of the first type, in the longitudinal direction. In FIG. 4, the magnet arrangement PM is additionally shown as surrounding the chamber on the outside, and can be formed by means of coils or preferably by means of permanent magnets. Electrode arrangement and/or magnet arrangement are advantageously adapted to the extended cross-sectional shape of the ionization chamber, in their geometry.

The above characteristics and those indicated in the claims as well as evident from the drawings can advantageously be implemented both individually and in different combinations. The invention is not limited to the exemplary embodiments described, but rather can be modified in many different ways, within the scope of the ability of a person skilled in the art.

The invention claimed is:

1. Ion accelerator arrangement having an ionization chamber, a magnet arrangement, and an electrode arrangement, and having means for introducing a neutral working gas into the ionization chamber, wherein
    the electrode arrangement generates an electrostatic acceleration field in the ionization chamber, for positively charged ions, which points predominantly in the longitudinal direction of the arrangement,
    the magnet arrangement generates a magnetic field in the ionization chamber, which has at least one longitudinal segment of a first type, having a magnetic field that runs predominantly perpendicular to the longitudinal direction, and a longitudinal segment of a second type, having a progression of the magnetic field that runs predominantly parallel to the longitudinal direction, adjacent to the longitudinal segment of the first type on both sides, in each instance,
    the ionization chamber has an ion exit opening in the longitudinal direction, and is delimited laterally by a circumferential chamber wall, and forms a simply cohesive cross-sectional surface perpendicular to the longitudinal direction of the chamber cross-section, which is at least twice as great in a first direction (y) as in a second direction (x) perpendicular thereto.

2. Arrangement according to claim 1, wherein the magnetic field (MF), the electrostatic field (EF), and the dimension (KH) of the chamber cross-section in the second direction (z) are approximately constant (KH(y)=constant), in a center region (MI) in the first direction (y).

3. Arrangement according to claim 1, wherein the ionization chamber is structured with mirror symmetry with regard to two orthogonal planes (x-y, x-z).

4. Arrangement according to claim 1, wherein a cathode (KA), as an electron source, is disposed in the region of the ion exit opening (AO) and laterally offset from the latter.

5. Arrangement according to claim 1, wherein no electron-emitting cathode is provided as a neutralization electron source and/or primary electron source to generate the ion beam.

* * * * *